United States Patent [19]

Redlich et al.

[11] 4,351,047
[45] Sep. 21, 1982

[54] CENTERING OF A DISC-SHAPED RECORD CARRIER ON A TURNTABLE

[75] Inventors: Horst Redlich, Berlin; Heinz Borchard, Nortorf; Rainer Ihlenburg, Berlin, all of Fed. Rep. of Germany

[73] Assignee: Licentia Patent-Verwaltungs-G.m.b.H., Frankfurt am Main, Fed. Rep. of Germany

[21] Appl. No.: 193,388

[22] Filed: Oct. 2, 1980

[30] Foreign Application Priority Data

Oct. 2, 1979 [DE] Fed. Rep. of Germany ....... 2939865

[51] Int. Cl.³ .......................... G11B 3/60; G01B 25/04
[52] U.S. Cl. .................................................. 369/270
[58] Field of Search ............... 369/261, 263, 264, 270, 369/271, 272, 268, 266, 280, 282

[56] References Cited

U.S. PATENT DOCUMENTS 3,867,724  2/1975  Bruer et al. ........................ 369/270
4,218,065  8/1980  Van der Hoek et al. .......... 369/271
4,256,312  3/1981  Ikeda ................................... 369/269

FOREIGN PATENT DOCUMENTS 2821296 11/1979 Fed. Rep. of Germany ...... 369/264

Primary Examiner—Steven L. Stephan
Attorney, Agent, or Firm—Spencer & Kaye

[57] ABSTRACT

A device for centering a record disc with respect to a turntable, in which the disc is successively radially centered and axially positioned relative to the turntable, which device includes a centering shaft engageable with the disc to effect preliminary radial centering thereof, is additionally provided with further radial centering elements mounted to engage a disc after it has engaged the shaft and to undergo yieldable movement relative to the turntable in the axial direction of the disc under the influence of its engagement with the disc for effecting final radial centering of the disc, and a magnetic attracting unit operatively associated with the disc and the turntable for axially positioning the disc after it has been finally radially centered.

11 Claims, 3 Drawing Figures

CENTERING OF A DISC-SHAPED RECORD CARRIER ON A TURNTABLE

BACKGROUND OF THE INVENTION

The present invention relates to the centering of a disc-shaped record carrier on a turntable, which centering is effected relative to the radial direction, with associated alignment of the record carrier in the vertical, or axial, direction.

Disc-shaped record carriers are known which are provided with centering means in their center for positioning the record carrier in a centered manner during the playback process. In the simplest case the centering means are constituted by a hole in the center of the record carrier. A preferably conical centering shaft is introduced into this hole so as to center the record carrier in the radial direction. Vertical positioning, or alignment, is produced by contact with the turntable. For a video or audio record on which information is stored according to the high density storage technique, centering by means of a conical shaft is no longer sufficient. The record carrier must be centered radially with such precision that an eccentricity of less than 0.02 mm will not be exceeded. Such an extremely small range cannot be attained by a conical centering shaft which is fitted into the center of the record.

To nevertheless attain such extreme centering accuracy, record carriers are manufactured which are provided with centering means disposed at the same side as that on which the information is picked up. In this way, the centering is always matched to the side being played. A frustoconical raised portion can be provided for this purpose on each side of the record carrier and this raised portion is arranged precisely centrically with respect to the recording grooves on the same side. Achievement of a perfectly centric position of the centering means relative to the grooves would assure that during playback the playback stylus will always move only in one radial direction. The record carrier itself is held on the turntable during playback by a magnet which cooperates magnetically with a metal ring inserted into the record carrier. Vertical alignment with respect to the playback plane of the record carrier is produced by contact with the turntable.

Since two centering processes are required to center the record carrier, namely radial *and* vertical alignment, one centering process may easily interfere with the other. It is necessary for the record carrier to first to aligned radially, and the vertically on the turntable. This is the case as well when the record is guided by a frustoconical shaft, or hub, in a matching centering recess in the record carrier.

Due to the radial cnetering by means of a frustoconical raised portion or recess on the side of the record carrier bearing the information to be played back, it is necessary to perform radial centering on this side as well. Bringing the conical centering means through a hole is not sufficient. Vertical and radial centering must take place simultaneously. This would require a double fitting which could have the result of an unsatisfactory centering.

SUMMARY OF THE INVENTION

It is an object of the present invention to center a record carrier having a centering arrangement on the playback side so as to permit successive radial and vertical alignment without mutual influence therebetween.

This and other objects are achieved, in a device for centering a record disc with respect to a turntable, in which the disc is successively radially centered and axially positioned relative to the turntable, which device includes a centering shaft engageable with the disc to effect preliminary radial centering thereof, by the provision of further radial centering means mounted to engage a disc after it has engaged the shaft and to undergo yieldable movement relative to the turntable in the axial direction of the disc under the influence of its engagement with the disc for effecting final radial centering of the disc, and magnetic attracting means operatively associated with the disc and the turntable for axially positioning the disc after it has been finally radially centered.

The present invention makes it possible to initially perform a radial centering of the record carrier, and only then the vertical alignment. The spring path of the centering ring is dimensioned in such a way that the magnetic attraction force on each point of a radial centering path is always greater than the spring forces of the springs. By suitably dimensioning the distance between the source of magnetic attraction and the record carrier, the holding force can be set to correpond to existing requirements. A preliminary centering is effected by means of a conical shaft. The present invention permits very accurate and precise centering of the record carrier as it is necessary for video records and audio records which are to be played back according to the pressure scanning method.

DESCRIPTION OF THE PREFERRED EMBODIMENTS

Figure 1:
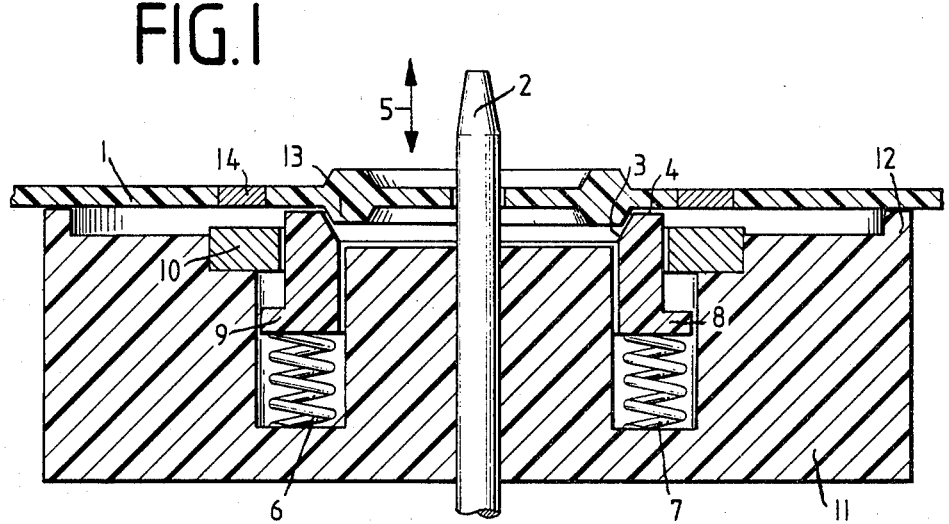
FIG. 1 is a cross-sectional elevational view of a preferred embodiment of a centering device according to the invention with a correspondingly designed record carrier disposed thereabove.

FIG. 1 is a cross-sectional view of a centering means according to the invention. When a record carrier 1 is placed onto a playback instrument, the record is initially preliminarily centered radially by a slightly conical shaft 2. The actual precise radial centering is effected by a ring 4 which is rounded at its upper inner edge 3. This ring 4 is freely movable over a certain distance in the vertical direction 5. The ring 4 is held in its rest position at the upper end of its displacement path by one or a plurality of springs 6 and 7 arranged below the circumference of the ring 4.

Ring 4 is provided with an outwardly projecting flange or abutments 8 and 9 which delimit this upper position of ring 4 by abutting against the lower surface of a ring magnet 10. The ring magnet 10 is inserted into a rotatable support body 11 for the carrier at a distance of preferably 1 mm from the record carrier when the latter is placed onto a supporting ring 12 forming part of support body 11. The disc-shaped record carrier 1 placed in this manner thus rests only on the supporting ring 12 but not on the ring magnet 10 from which it remains separated by the distance of about 1 mm.

Once the disc-shaped record carrier 1 has been precentered by means of shaft 2, it comes to bear against the bevelled inner edge 3 of the ring 4 via a raised annular ridge portion 13 integral with the record carrier. Now the actual centering will take place since the raised portion 13 of the record carrier 1 is disposed precisely centrically relative to the recording grooves. The record carrier and the ring 4 are now pulled further downwardly together by the magnet ring 10 against the force of springs 6 and 7. The ring 4 must be very precisely guided in the support 11, without any tolerances, otherwise there would occur radial centering errors. The necessary precision can be reached by sufficiently accurate machining of the various components.

Figure 2:
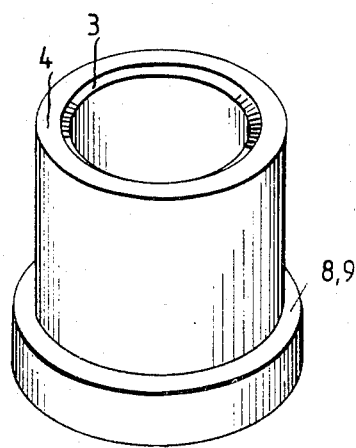
FIG. 2 is a perspective view of the centering ring of the embodiment of FIG. 1.

FIG. 2 is a perspective view of the centering ring 4 of the embodiment of FIG. 1.

Figure 3:
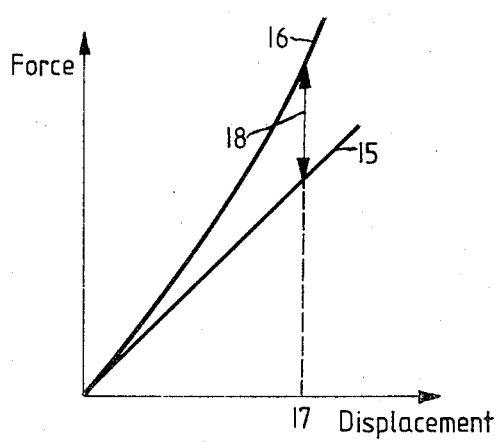
FIG. 3 is a performance diagram illustrating the holding process carried out by the embodiment of FIG. 1.

The operation of a centering device according to the invention will be explained with reference to FIG. 3. Since a spring restoring force is directly proportional to the amount of spring deformation, the spring restoring force increases with increasing deformation. In the diagram of FIG. 3 the straight line 15 represents the spring characteristic, i.e. the vertical force exerted by springs 6, 7 on ring 4. The magnet ring 10 inserted into the support 11 serves to hold the record carrier 1 and its inserted magnetic metal ring 14. This is possible only if the holding force exerted by the magnet ring 10 on ring 14 is greater than the spring force exerted by springs 6 and 7 in the direction opposite to this magnetic force. The weight of the record carrier 1 opposing the spring force and that of ring 4 need not here to be taken into consideration.

To a first approximation, a magnetic force vs. distance characteristic has an approximately parabolic shape, i.e. the holding force exerted by a magnet increases quadratically with its approach to a magnetic body. In the diagram of FIG. 3, the curve 16 represents the magnetic atttraction between magnet ring 10 and ring 14 as a function of the distance therebetween. It can be seen that initially the spring force is only slightly less than the magnetic attraction force. Due to the steeply conical surface which is tangent to the line of contact between ring 4 and the centering means 13 of the record carrier, which forms an angle of greater than 45° to the record surface, the radial centering is effected before the holding force exerted by magnet ring 10 is great enough to cause the record carrier 1 to rest flush on the supporting ring 12. The lateral displacement force exerted by ring 4 on annular portion 13 is thus greater than the attraction force produced by magnet ring 10 until shortly before reaching poin 17 on the displacement path of carrier 1 and ring 4. Of course, ring 4 and portion 13 are configured so that the ring contacts that portion but not the flat undersurface of disc 1.

The holding force produced by magnet ring 10 must not become greater than the lateral displacement force exerted by ring 4 on centering portion 13 until a record which has not initially been placed parallel to the supporting ring 12 has been centered and rests on all points of the supporting ring 12. Radial centering of the record carrier must be completed over the displacement path traversed by the time point 17 is reached. At point 17, the record carrier is firmly held by means of the difference 18 between the magnetic holding force and the spring restoring force.

The vertical displacement path of the record carrier 1 is limited by the supporting ring 12 in order to prevent the magnetic force from becoming too great as this could produce difficulties in removing the record carrier. With a defined supporting ring 12 it is also possible to attain improved vertical centering. The defined surface of supporting ring 12 can be achieved by precise surface grinding. The plane of the surface of ring 12 is ground exactly to an angle of 90° to the axis of shaft 2.

It will be understood that the above description of the present invention is susceptible to various modifications, changes and adaptations, and the same are intended to be comprehended within the meaning and range of equivalents of the appended claims.

What is claimed is:

1. In a device for centering a record disc with respect to a turntable, in which the disc is successively radially centered and axially positioned relative to the turntable, which device includes a centering shaft engageable with the disc to effect preliminary radial centering thereof, the improvement comprising: further radial centering means spaced from the shaft and mounted to engage a disc a location other than the center hole of the disc after the disc has engaged the shaft and to undergo yieldable movement relative to the turntable in the axial direction of the disc under the influence of its engagement with the disc for effecting final radial centering of the disc; and magnetic attracting means operatively associated with the disc and the turntable for axially positioning the disc after it has been finally radially centered.

2. An arrangement as defined in claim 1 wherein said further centering means comprise a centering ring and spring biasing means mounted between said centering ring and the turntable for urging said centering ring against the disc.

3. An arrangement as defined in claim 2 wherein the record disc is provided with a radial centering element positioned to cooperate with said centering ring.

4. An arrangement as defined in claim 2 wherein the spring characteristics of said biasing means are selected for causing the final radial centering to be completed before the disc is held in its axial position by said magnetic attracting means.

5. An arrangement as defined in claim 1 wherein before the disc is axially positioned said further radial centering means exerts a force in the radial direction on the disc which is greater than that exerted on the disc by said magnetic attracting means.

6. An arrangement as defined in claim 5 wherein: said further centering means comprise a centering ring having a curved centering surface and spring biasing means mounted between said centering ring and the turntable for urging said centering ring against the disc; the disc is provided with a radial centering element having a conical surface arranged to cooperate with said curved surface of said ring; and radial centering of the disc is effected by creation of a radial centering force constituted by the difference between the force produced by said biasing means and the force exerted by said magnetic attracting means, acting between said curved surface of said ring and the conical surface of the centering element.

7. An arrangement as defined in claim 6 wherein the conical surface of the centering element forms an angle of greater than 45° with the disc axis.

8. An arrangement as defined in claim 5 wherein said magnetic attracting means comprise a ring magnet fixed to the turntable and means for holding a record disc in axial position at a defined distance from said magnet.

9. An arrangement as defined in claim 8 wherein the defined distance is of the order of 1 mm.

10. An arrangement as defined in claim 1 wherein the turntable is provided with a supporting ring located for supporting the disc at its desired axial position and to limit the axial displacement of the disc under the influence of said magnetic attracting means.

11. An arrangement as defined in claim 1 further comprising a support defining the turntable, firmly connected to said shaft, and carrying said further centering means and a portion of said magnetic attracting means.

* * * * *